United States Patent
Arno et al.

[11] Patent Number: 6,099,620
[45] Date of Patent: Aug. 8, 2000

[54] HEAT REGENERATED DESICCANT GAS DRYER AND METHOD OF USE

[75] Inventors: Raymond P. Arno, Amherst; Daniel Blaszkowiak, Buffalo, both of N.Y.

[73] Assignee: Tekair, L.P., Lancaster, N.Y.

[21] Appl. No.: 09/098,554

[22] Filed: Jun. 17, 1998

Related U.S. Application Data

[60] Provisional application No. 60/050,365, Jun. 20, 1997.

[51] Int. Cl.[7] .................................................. B01D 41/00
[52] U.S. Cl. ............................................................. 95/121
[58] Field of Search ........................... 34/80, 81; 96/143, 96/144; 95/117, 121, 123

[56] References Cited

U.S. PATENT DOCUMENTS

| | | | |
|---|---|---|---|
| 2,626,675 | 1/1953 | Maher | 183/4 |
| 2,709,496 | 5/1955 | Baker | 183/4.1 |

*Primary Examiner*—Henry Bennett
*Assistant Examiner*—Malik N. Drake
*Attorney, Agent, or Firm*—Howard M. Ellis; Marianne Fuierer

[57] ABSTRACT

An apparatus and method of use for effectively purging desiccant air dryers of moisture load by introducing heated purge air into the containment vessel holding the desiccant, directly into those areas of the desiccant bed where the moisture loads are most heavily saturated. The improved heat regenerated desiccant gas dryer utilizes parallel ports for introducing heated air or an internal heat distributor, the former automatically controlled by valves selectively operated to allow purge air to quickly cause water vapor adsorbed by the desiccant to be released and discharged from the vessel, allowing the dryer to be returned to service in the gas drying mode with greater confidence that undesirable dew point spikes have been eliminated. More efficient use of heated purging air enables shorter turn-around times for the dryer and energy savings.

21 Claims, 4 Drawing Sheets

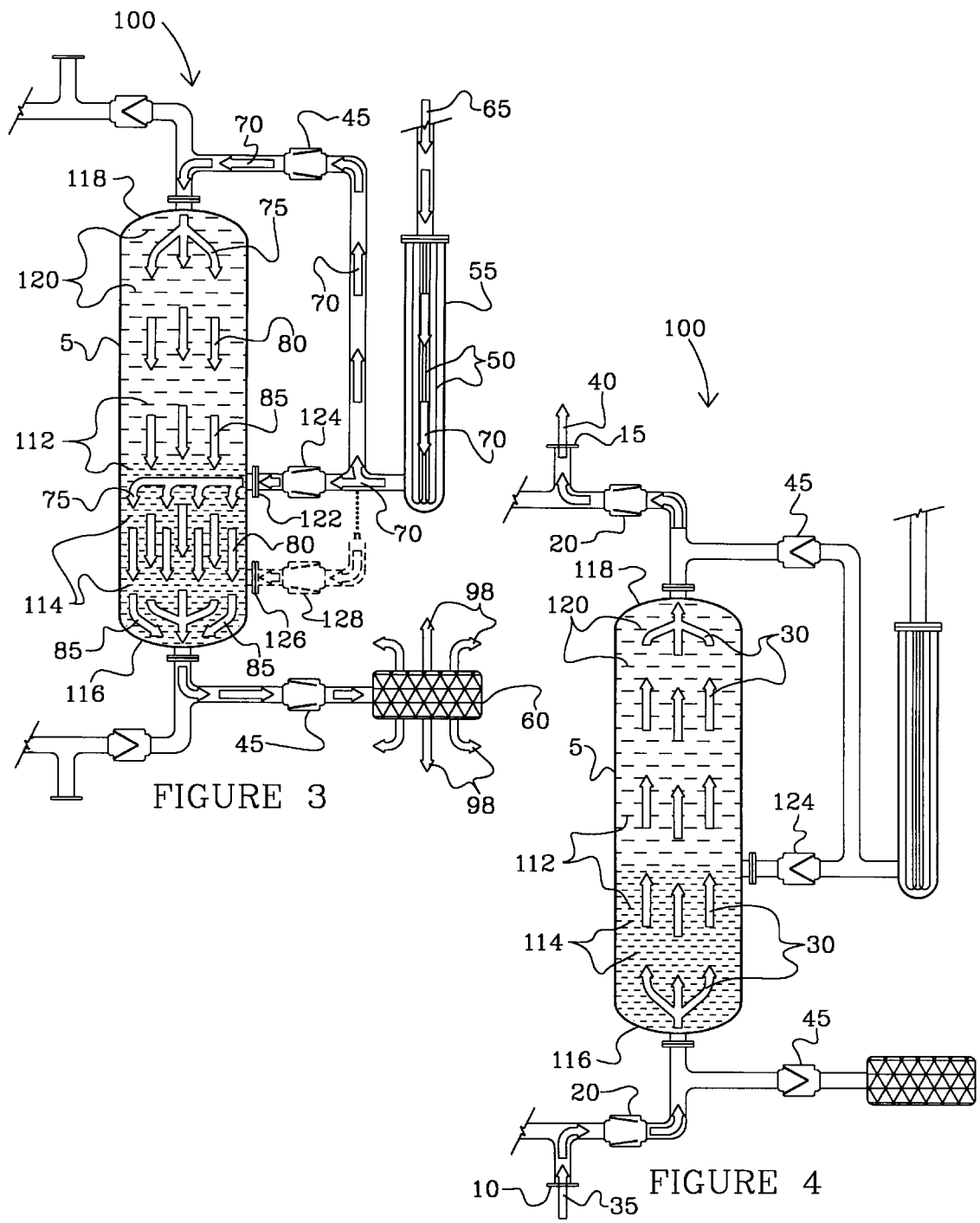

HEAT REGENERATED DESICCANT GAS DRYER AND METHOD OF USE

CROSS REFERENCE TO RELATED APPLICATION

This application claims the benefit of U.S. Provisional application Ser. No. 60/050,365, filed Jun. 20, 1997.

TECHNICAL FIELD

The present invention relates generally to devices for drying gas, and more specifically, to highly efficient multi-port injection, heat regenerated desiccant air dryers and methods of use.

BACKGROUND OF THE INVENTION

In industry, air and pressurized (compressed) air are widely employed in operating equipment and machinery in manufacturing, product fabrication, and in countless other applications and scenarios. Air and compressed air in particular, is often laden with moisture which negatively impacts on the performance and life expectancy of equipment, machinery, applications and processes, ultimately resulting in costly equipment failure, downtime and befouled product.

One desirable method employed in removing moisture from air and other gases has been through the use of a drying agent or desiccant (adsorbent). Desiccant dryers have been one of the premiere means for successfully removing substantially all moisture from air for industrial applications thereby reducing equipment failures and improving product quality. Desiccant air dryers typically are comprised of a pressure vessel filled with the desiccant material, piping and valves as means for controlling air flow throughput and means for purging moisture from the drying agent. Generally, these systems can have other useful features, such as filters to remove oil and dirt, screens to contain the desiccant within the vessel, electronic controls, liquid draining devices, and so on. In addition, many configurations of desiccant air dryers are constructed of dual components, so that the apparatus may be on-line using one set of components while the second set is regenerating itself of captured (adsorbed) moisture. Such systems are known as "Twin Tower" dryers.

Because desiccant loses its ability to effectively remove moisture after a period of use, desiccant filled gas dryers are required to operate in a regenerative mode with a desorption half-cycle to remove water from the drying agent to reactivate it for another adsorption half-cycle. This regeneration process represents a significant amount of unproductive downtime and direct costs in operation of heaters and/or blowers, or in the case of dry purge methods, to extract the collected moisture from the desiccant material. Regeneration of the desiccant and purging moisture from the dryer can take several hours to complete, and represents typically fifty percent of the duty cycle of the dryer, e.g., 4 hours on-line for removing water from an air stream, and 4 hours off-line for regenerating, cooling and repressurizing, depending of the capacity/size of the system and air volume.

As previously stated, one aspect of the problem of desiccant regeneration stems from the high energy requirements in the form of heat and/or electrical power needed to remove moisture and dry the desiccant. Heretofore, in the regeneration phase it has been the practice to inject heated purging air into the pressure vessel at one end and force it through the moisture laden desiccant bed and out the other end of the vessel. Moisture adsorbed by the desiccant is routinely more concentrated at the first end or air entry end of the vessel and is less concentrated in the region of the second end or air exit end of the vessel. In an "up-flow dryer" the bottom or first end of a vessel holding the desiccant bed is the air entry end during the air drying phase of a cycle (adsorption half-cycle) while the second end or top end of the pressure vessel is the air entry end during the regeneration phase of a cycle (desorption half-cycle) or moisture purge mode in removing water from the adsorbent. Conversely, in a "down-flow dryer" the top or first end is the air entry end during the air drying mode of the cycle while the bottom or second end is the air entry end during the regeneration mode of the cycle.

Irrespective of the type desiccant air dryer, either up-flow dryer or down-flow dryer, the practice of injecting hot air through a single port at one end of the vessel in the regeneration mode results in an undesirable temperature imbalance when purging moisture from the desiccant. Conventional regeneration processes typically overheat the vessel output end because of the prolonged time required to sufficiently reach a proper temperature at the vessel input at the opposite end, where most of the moisture resides. That is, the time required for the flow of heated air to purge or desorb the stratified portions of the desiccant most heavily saturated with moisture at the vessel input end results in excessive heating of the vessel and desiccant, wasting energy and time to allow these overly heated areas to sufficiently cool before returning the unit to drying air or other gases.

To illustrate further, in the desorption half-cycle (regeneration mode) it has been found that the temperature can range from about 350° F. to about 650° F. or more, at the heated air entry end while only 200° F. at the air exit end of the vessel during regeneration. This imbalance leads to wasted energy and higher operating costs through higher temperatures in vessel heating and longer operation of blower motors for the period of time required to purge substantially all the moisture from throughout the bed. Other consequences of this temperature imbalance include overly (or unevenly) dried desiccant at one end of the bed; protracted downtimes due to longer cool down periods before the system can be returned to service (adsorption cycle); and dew point "bump" or spikes where moisture laden air remains in the desiccant bed due to a temperature hot spot. Such moist air, if forced out of the dryer as dry air can result in down stream technical problems in the application of the use of dried air Accordingly, there is a need for an improved heat regenerated desiccant gas dryer and method of use which will consume less energy and use it more efficiently, permit shorter turn around times in regenerating the desiccant bed in removing water during the desorption half-cycle, avoiding temperature imbalances and over heating the apparatus, and elimination of hot spots and spikes or dew point bumps.

SUMMARY OF THE INVENTION

In accordance with the invention an improved heat regenerated desiccant gas dryer and method of regeneration are provided which effectively balances the temperature of the dryer during the regeneration mode by more effective, direct injection of heated air within the dryer for more efficient thermal drying of the desiccant. Heat for drying the desiccant is distributed more closely in accordance within the normal stratification of moisture in a desiccant bed, so the heat is delivered directly to those regions more heavily saturated with moisture, which means that less heat needs to be applied to those areas having lower moisture levels. As a result, the turn around time for the air dryer from off-line to on-line service to the air drying mode of operation (adsorption half-cycle) is shortened. Advantageously, the improved desiccant gas dryers of the invention are more economic to operate, and more productive, as well. In sum, the heat regenerated gas dryers and methods of use of the present invention avoid temperature imbalances, over heating and hot spots with lower to zero spikes in dew point (bumps), and reduced energy consumption without negatively affecting the performance of the dryer in the removal of moisture from a process stream.

It is therefore a principal object of the invention to provide a desiccant gas dryer, which comprises

- a pressure vessel having an interior chamber defined by a vessel side wall comprising one or more purge inlet ports, a first end wall having a moist gas inlet, and a second end wall having a dry gas outlet;
- a bed comprising a regenerable desiccant agent disposed within the interior chamber of the pressure vessel;
- means for injecting a stream of moist gas through said moist gas inlet of the pressure vessel for diffusion through the bed and for discharging dried gas through the dry gas outlet during a moisture sorption phase, and
- means for directly injecting a stream of heated air into the bed through the one or more purge inlet ports in the pressure vessel side wall for removing moisture from the bed. The desiccant gas dryer includes exhaust means for discharging moisture and air during desiccant regeneration.

The purge inlet ports are preferably parallel ports with at least one port positioned off-center in the region proximate to the moist gas inlet. The objective is to position the parallel ports along the side wall of the vessel so they are appropriately spaced from one another to achieve substantially uniform temperature balance during desiccant regeneration.

It is still a further object of the invention to provide heat regenerated desiccant gas dryers including valve means and controls therefor for automatically regulating the injection of heated air to the bed during desiccant regeneration. Appropriate controls may include, for instance, multiple thermal sensors for generating signals to a programmable controller or microprocessor which responds by automatically regulating the flow of heated air during the regeneration phase.

For purposes of this invention the term "gas" as appearing in the specification and claims is intended to include any of air, and particularly compressed air, natural gas, nitrogen and mixtures thereof. The term is intended to include other gases in addition to those specifically named above, and contain moisture which can be safely and suitably purged from the desiccant during regeneration.

In describing the invention, the specification may refer to the heat regenerated desiccant gas dryers as "desiccant air dryers" or simply as "air dryers" or variations of these expressions. The reference to "air" type dryers is for purposes of convenience only, and is not intended as a limitation or restriction with regard to the type of gas which may be suitably dried with the devices and methods of the invention. Accordingly, it should be understood the expression "desiccant air dryer" also includes the utility of drying other gases, such as nitrogen, natural gas, and so on.

The term "desiccant" as used herein is intended to have its ordinary understood meaning. It comprises drying agents which are solids, rather than liquids, and are regenerable, i.e., can be reactivated through the application of heat or air flow passing over and around the desiccant. Representative examples include such members as activated alumina, silica gel and molecular sieves, e.g., naturally occurring or synthetic zeolites characterized by the ability to undergo dehydration with little or no change in crystal structure thereby providing a very high surface area for adsorption of foreign molecules.

The term "sorbed" or "sorption" or "sorb" and variations thereof, e.g., desorb, as appearing in the specification and claims herein are intended to mean to take up water by any mechanism, usually either adsorption or absorption of moisture or molecules of the water by desiccants, or the release of the same by the desiccant, i.e., desorb.

It is yet a further object of the invention to provide a desiccant gas dryer, which comprises

- a pressure vessel having an interior chamber defined by a vessel side wall, a first end wall having a moist gas inlet, and a second end wall having a dry gas outlet;
- a porous heated air distributor disposed within the interior chamber of the pressure vessel;
- a bed comprising a regenerable desiccant agent disposed within the interior chamber of the pressure vessel adjacent to the porous heated air distributor;
- means for injecting a stream of moist gas through the moist gas inlet of the pressure vessel for diffusion through the bed and for discharging through the dry gas outlet during a moisture sorption phase, and
- means for injecting a stream of heated air into the bed through the porous heated air distributor for removing water from the bed. The desiccant gas dryer includes an exhaust means for discharging moisture and air during desiccant regeneration.

Generally, the porous heated air distributor is a tubular member which performs substantially as a sparger. It usually runs the length of the bed with spaced outlets discharging heated air internally, directly within the interior of the bed. The population of outlets in the distributor is greater in the region of the bed where the concentration of moisture in the desiccant is normally greater, i.e., in the area of the moist gas inlet of the pressure vessel, and fewer in number in the areas of bed having less moisture, i.e., dry gas outlet. The objective is to have outlets positioned at distances relative to one another sufficient to achieve substantially uniform temperature balance in accordance with the moisture distribution in the desiccant.

It is still a further object of the invention to provide a method of regenerating a desiccant gas dryer, which comprises the steps of:

providing a bed comprising a regenerable desiccant agent disposed within an interior chamber of a pressure vessel, the bed having moisture adsorbed thereon;

(i) regenerating the desiccant by directly injecting multiple streams of heated air into the interior of the bed through multiple heated air discharge locations positioned internally within the bed or (ii) impinging multiple streams of heated air directly against the bed exterior wherein at least one stream engages a side of the bed through a port in a side wall of the pressure vessel, and purging moist heated air from the pressure vessel.

According to the method of the invention it is an object to regenerate a desiccant gas dryer and do so by thermal balancing through the introduction of multiple streams of heated air from points other than the top or bottom of the pressure vessel and by concentrating heat entry points where the moisture stratification in the bed is more concentrated.

BRIEF DESCRIPTION OF THE DRAWINGS

For a further understanding of the invention and its characterizing features reference should now be made to the accompanying drawings wherein:

FIG. 3 is a side elevational view of a first embodiment of a heat regenerated gas dryer according to the invention configured in a regeneration mode and illustrated with multiple external injection ports;

FIG. 4 is a side elevational view of the heat regenerated gas dryer of FIG. 3, but configured in a drying mode;

DESCRIPTION OF THE PREFERRED EMBODIMENTS

Figure 1:
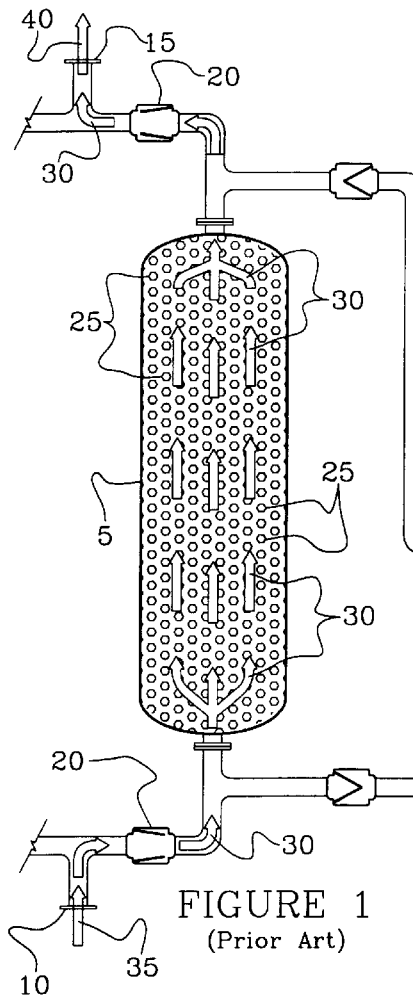
FIG. 1 is a side elevational view of a desiccant air dyer representative of the prior art, illustrated in a drying mode, adsorption half-cycle phase.

Turning first to FIG. 1, there is shown a general arrangement of components found in prior heat regenerated adsorbent air dryers of conventional design, illustrated in drying or in adsorption half-cycle mode of operation. The dryer typically comprises a containment vessel 5 with an air inlet 10, a dry air outlet 15 and a dry mode control valve set 20. The vessel is filled with a desiccant 25. When operating in the drying mode, air flow passes through the bed containing desiccant 25 entering the system from an inlet 10 and exiting through outlet 15, as indicated by air flow arrows 30.

Air 35 entering the dryer through inlet 10 is high in moisture (water) content. As it makes its way through containment vessel 5, the moisture is sorbed or captured by the desiccant 25. The purpose of the apparatus is to remove moisture from the air to provide dry or substantially dry air 40 at outlet 15, so it may be used in industry for any number of applications, a few of which were described hereinabove.

Figure 2:
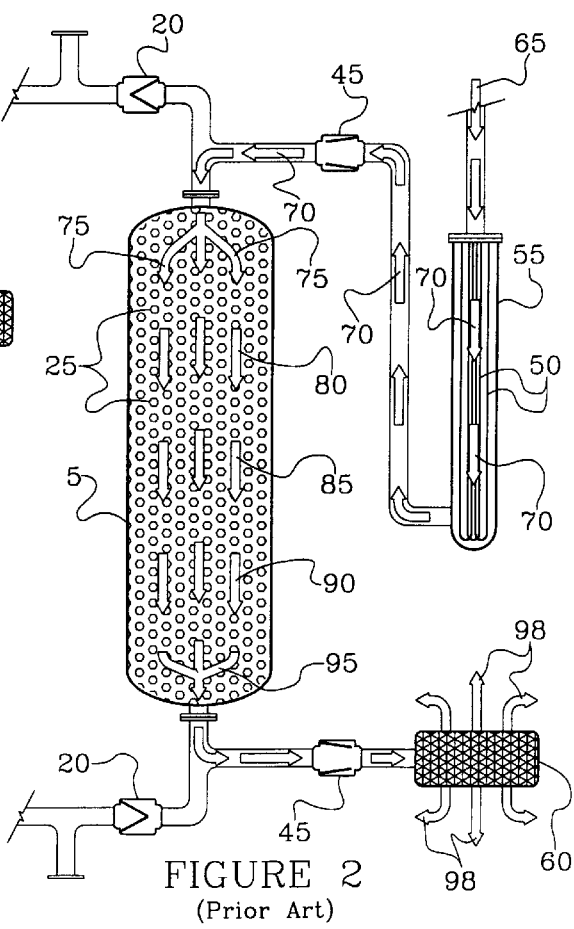
FIG. 2 is a side elevational view of the prior art desiccant air dyer of FIG. 1 configured in a regeneration mode, desorption half-cycle.

The prior art air dryer of FIG. 1 is shown in a regeneration or desorption half-cycle mode in FIG. 2, wherein the desiccant, after a period of operation in the drying mode, is reactivated/renewed by removing or purging water therefrom. In the regeneration mode of operation, the dry mode control valves 20 are closed and purge mode control valve set 45 are opened. Other components, namely heater elements 50, heater element containment 55, and muffler 60 are utilized in the purge process to heat incoming purge air and to discharge exhaust air and moisture desorbed from the desiccant bed. Purge air source 65 enters heater containment 55 and heated by heater elements 50, for example, to 500° or 600° F. The flow of heated air shown by arrows 70 indicate the usual path of heated purge air 65 and entry into vessel 5 as arrows 75, at a temperature of about 450° F., for example. It is significant to note, in this prior art device the path of the heated purge air is directed into the top of vessel 5, where the moisture content of the desiccant is relatively low. This is exactly opposite to the direction of the drying mode air flow path 30 within the vessel 5, as illustrated by FIG. 1. The purge air flow 65 passes through the bed containing desiccant 25 to the opposite end of vessel 5, to exit the desiccant air dryer via muffler 60. Arrows 80, 85, 90 and 95 represent the purge air flow, cooling as it progresses through the desiccant bed to exit the vessel and finally the device. These cooling temperatures could be, for example, 350° F., 250° F., 200° F., 150° F., respectively as the purge air flow 65 exits the vessel, and through the muffler 60 into the ambient air as exhausted purged air 98.

It is important to appreciate the negative result of the heating curve indicated above, where the hotter purge air first entering the vessel needs to be present for a sufficient time period to traverse the desiccant bed to the exiting end. If the exiting end of the vessel is not heated to a sufficiently high temperature, e.g., 200° F., or exposed to air flow for sufficient time period to release the moisture from the desiccant, the desiccant remains moisture laden and not properly dried. However, to assure a proper purge temperature at the exiting end, the above mentioned problem of over heating is created at the entering end. Hence, the heat regenerated gas dryer of the prior art operates inefficiently with a temperature imbalance.

The prior art has been detailed in the FIGS. 1 and 2, so there is a full understanding of the present invention, i.e., an improved heat regenerated gas dryer and process for regeneration. FIGS. 1 and 2 represent an up-flow configuration. As mentioned above, in an up-flow dryer in the air dryer mode of operation moist air enters the vessel at the bottom and flows up through the bed of desiccant and exits out the top, while in the regeneration mode the heated air flow enters the top of the vessel and passes through the desiccant bed to exit out the bottom. The opposite configuration, namely the down-flow dryer, in the air drying mode moist air enters the vessel at the top, traverses the desiccant bed and exits at the bottom, while in the regeneration mode heated air for drying the bed enters the bottom of the vessel and exits at the top. A further dryer with concurrent flow operates so both drying and regeneration modes enter and exit the vessel in the same direction. This configuration leaves an undesirable potential dew point bump or spike condition within the desiccant at the system exit end upon changeover to the drying mode of operation.

The remaining figures detailing the present invention are shown in their preferred embodiment in up-flow configuration, but are equally suited for down-flow and concurrent flow configurations.

FIG. 3 illustrates a first embodiment of the improved heat regenerated desiccant gas dryer 100 configured in an up-flow layout, but in desiccant regeneration mode of operation with the injection of heated air for drying in a downward direction of flow. The vessel 5 is shown with moisture load 112. A desiccant bed, not shown for clarity of presentation, is the element which sorbes water vapor from the moist gas during the drying mode of operation. The moisture load 112 is stratified within the desiccant bed with the more heavily saturated region 114 at the vessel's lower moist gas input end 116 than the vessels dry gas output end 118 where less moisture, i.e., water vapor 120 is sorbed.

The improved heat regenerated desiccant gas dryer 100 of the present invention utilizes at least one injection port comprising a directed purge inlet port 122 through the side wall of the vessel, and a purge control valve 124. It will be understood that a multiport injection configuration comprising a plurality of parallel purge inlet ports 122 and 126 with parallel purge control valves 124 and 128 are fabricated on the vessel as shown by FIG. 3. To fully understand the benefits of the multiport purge injection concept, a discussion of how the moisture load 112 is formed is presented in the detailed discussion of FIG. 4.

In operating the air dryer of FIG. 3 in desiccant regeneration mode, parallel purge control valves 124 (and 128, if more than one) and the main purge control valve 45 are opened to allow heated air from heater elements 50 at temperatures, e.g., 450° F., to be simultaneously injected directly into the lower side wall of the vessel housing the desiccant having the heavier stratified moisture. This is balanced with the delivery of heated air through the output end 118 of the vessel via main purge control valve 45 into the upper regions of the desiccant bed less heavily stratified with adsorbed moisture. The drying effect of heated air 75 is more balanced, both at the vessel output end 118 and at the multi purge injection ports 122 and 126 for more optimal temperature balance, and more efficient heating and drying of the bed. As the flow of heated air passes through the desiccant bed the air cools to 350° F. at the location of flow arrows 80, then to 250° F. at the location of flow arrows 85 as it nears the vessel input end 116. Purged moisture and air 98 are discharged through muffler 60. Valves 20 opened during drying mode are closed during the desiccant regeneration mode.

In operation, the improved heat regenerated dryer 100 has a more thermally balanced drying effect on the desiccant bed in that the heated purge air is directed to the areas of the desiccant bed which most need the drying. The result of directly injecting air flow 75 to the heavily saturated moisture layers 114 allows the sorbed moisture to be released (vaporized away) and purged from the desiccant bed in a more efficient manner. Hot air passes through the entire bed of desiccant quickly so as to not over heat the desiccant, vessel and associated ports and piping; as is the case in conventional purge processes where hot spots exist, creating undesirable dew point spikes in the drying mode of operation.

FIG. 4 illustrates heat regenerated desiccant air dryer 100 of FIG. 3, but in the air drying mode of operation. Desiccant air dryer 100 is quiescent, and when operating in drying mode air flows are unaffected because the parallel purge control valve 124 (and 128 if more then one—See FIG. 3) are closed. Also, coincidentally the main purge mode control valves 45 are closed during the drying mode. In the adsorption half-cycle drying mode moist air 35 is received for drying via air inlet 10; passes through lower drying mode control valve 20 and into vessel 5 through input end 116. Air flow 30 passes over and through the desiccant bed within vessel 5, and the moisture in the air is sorbed by the desiccant in the process. Over time, for example four hours, the desiccant bed becomes laden with moisture load 112 resulting in stratified weight layers of moisture forming a moisture gradient in the desiccant bed. The greatest weighted layers of moisture load are located at the vessel input end 116. The moist gas first entering the desiccant bed captures the largest number of water molecules resulting in heavily saturated stratification 114. As air flow 30 continues through to the vessel output end 118, there are fewer and fewer water vapor molecules to be attached or sorbed by the desiccant, resulting in a less saturated stratification 120 of moisture load 112.

Figure 5:
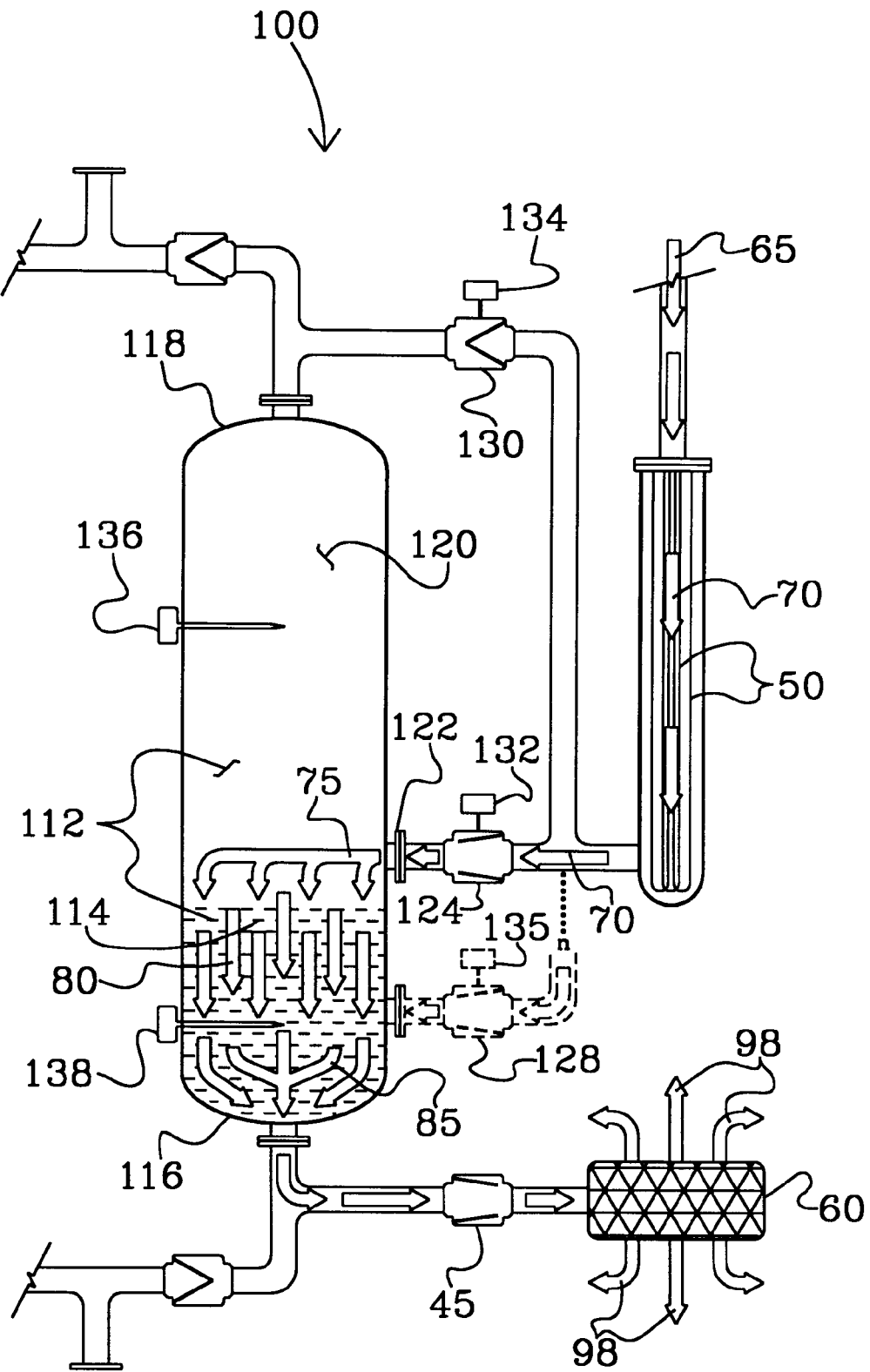
FIG. 5 is a side elevational view of a second embodiment of a heat regenerated gas dryer according to the invention shown with thermal sensors and solenoid actuated control valves, wherein the dryer is configured in regeneration, desorption half-cycle mode.

The present invention is shown alternatively in FIG. 5 with electronically controlled purge valves 124, 128 and 130, each with a solenoid 132, 135 and 134, respectively. A first thermal sensor 136 is disposed within the less saturated area 120 of the moisture load 112, and a second thermal sensor 138 disposed within the heavily saturated area 114. This embodiment of the invention utilizes a conventional PLC (Programmable Logic Module), not shown. The PLC is programmed to accept the thermal sensors as signal inputs and respond logically to activate and deactivate the solenoids 132, 135 and 134, for opening and closing purge valves 124, 128 and 130.

FIG. 5 illustrates one scenario where thermal sensor 136 has signaled a sufficiently high temperature, indicating substantially all moisture in the desiccant bed has been evaporated, and effect the PLC to signal the solenoid 134 to close control valve 130. The directed purging is now being injected exactly where the remaining moisture load is, within the heavily saturated area 114 of the vessel. Once thermal sensor 138 reaches a sufficiently high temperature it signals the PLC the desiccant has achieved proper purging temperature and provides an output to solenoids 132 and 135 to close control valves 124 and 128. Optionally, within a sequence of events the PLC may turn off heater element 50 and open all control valves 130, 124 and 128 for purging any residual heat remaining in the desiccant. Thermal sensors 136 and 138 provide even greater capability to the invention by timely removing the heated purge air flow from vessel 5, allowing faster turn around times from off-line regeneration mode to on-line service gas drying mode.

Figures 6, 7:
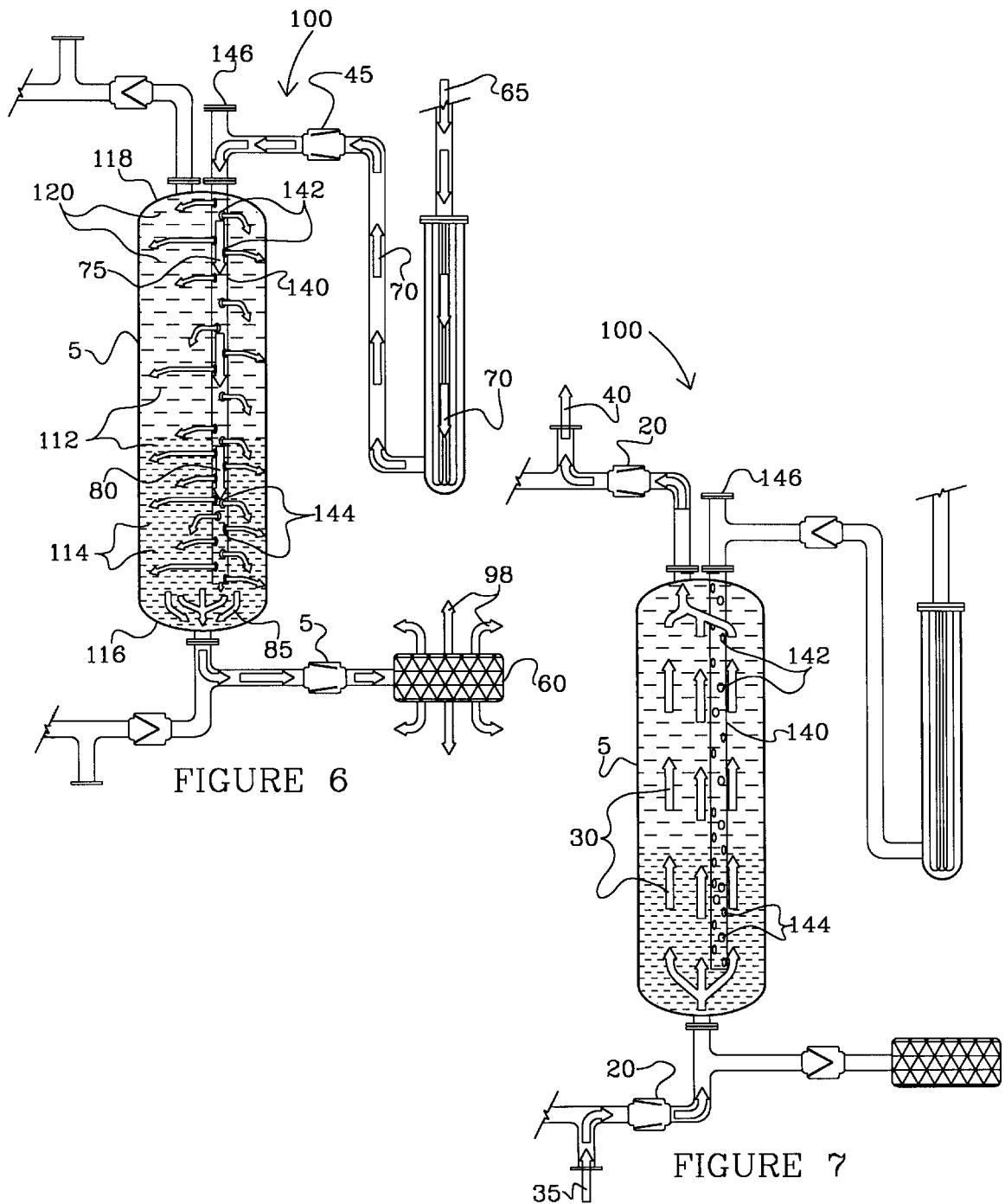
FIG. 6 is a side elevational view of a third embodiment of a heat regenerated gas dryer according to the invention illustrated with a multiple outlet distributor mean for injecting heated air directly into the interior of the desiccant, and configured in regeneration mode.
FIG. 7 is a side elevational view of the heat regenerated gas dryer of FIG. 6, but configured in a gas drying mode.

FIGS. 6–7 disclose a further embodiment of the invention. FIG. 6 illustrates the air dryer in regeneration mode, whereas FIG. 7 shows the device in a working mode of drying gas. This third embodiment of the improved heat regenerated desiccant air dryer 100 comprises as a key element a porous heated air distributor 140 for injecting purge air directly into the interior of the desiccant bed located in vessel 5 for more efficient drying of the desiccant (FIG. 6). The distributor 140, in the form of tubular member surrounded by the desiccant material, contains a multiplicity of air outlets 142 and 144 running substantially the length of the member. Outlets 142 are less populated in the region proximate to the vessel output end 118, and more densely populated 144 in the region proximate to the vessel input end 116. Thus, the population of air outlets 142 and 144 may increase gradually towards the vessel input end where the moisture in the desiccant is more heavily stratified. Distributor 140 stops short as it nears the vessel input end 116, which may have appropriate screening to contain the desiccant material.

To prevent a by-pass effect of air flow 30 (FIG. 7), porous heated air distributor 140 is filled with the same drying material used in the desiccant bed in vessel 5. Filling distributor tube 140 with desiccant may be performed through access port 146.

In the regeneration mode of operation (FIG. 6), directed purge air is injected into the vessel areas in a balanced manner, i.e., a greater volume of drying air 70 to the more heavily saturated layers 114 of stratified moisture load 112 within the desiccant bed, and less heated air to the less heavily saturated areas 120 within the desiccant bed.

To more fully appreciate the present invention, the improved heat regenerated desiccant dryer 100 effectively balances the air flow and thermal drying effect on the desiccant 25 within containment vessel 5. While the improved dryer 100 fully has no negative consequence on the air drying mode of operation, it greatly enhances purging moisture from the desiccant bed in the regeneration mode of operation by balancing the distribution of heated purge air through the device.

While the invention has been described in conjunction with various embodiments, they are illustrative only. Accordingly, many alternatives, modifications and variations will be apparent to persons skilled in the art in light of the foregoing detailed description, and it is therefore intended to embrace all such alternatives, modifications and variations as to fall within the spirit and broad scope of the appended claims.

We claim:

1. A desiccant gas dryer, which comprises
a vessel having an interior chamber defined by a vessel side wall comprising one or more purge inlet ports directly communicating with the interior chamber of said vessel, a first end wall having a moist gas inlet, and a second end wall opposite the first end wall having a dry gas outlet;
a bed comprising a regenerable desiccant agent disposed within said interior chamber of said vessel;
means for injecting a stream of moist gas through said moist gas inlet of said vessel for diffusion through said bed and for discharging dried gas through said dry gas outlet during a moisture sorption phase, and
means for injecting a stream of heated air directly into said bed through said one or more purge inlet ports in said vessel side wall for removing moisture from said bed.

2. The desiccant gas dryer of claim 1 comprising a plurality of parallel purge inlet ports in the side wall of said vessel.

3. The desiccant gas dryer of claim 2 including means for simultaneous injection of a stream of heated air into said bed through said parallel purge inlet ports in said vessel side wall and said dry gas outlet in the second end wall of said vessel.

4. The desiccant gas dryer of claim 2 which is a device for drying a gas selected from the group consisting of compressed air, natural gas and nitrogen.

5. The desiccant gas dryer of claim 2 wherein said parallel purge inlet ports are positioned adjacent to the bed in proximity to the highest concentration of moisture.

6. The desiccant gas dryer of claim 2 wherein said parallel purge inlet ports have at least one port positioned in proximity to said moist gas inlet.

7. The desiccant gas dryer of claim 4 wherein said parallel purge inlet ports are positioned along the vessel side wall and spaced from one another at distances sufficient to achieve substantially uniform temperature balance during desiccant regeneration.

8. The desiccant gas dryer of claim 1 wherein said controls for said valve means comprise multiple thermal sensors and a microprocessor, said thermal sensors generating signals to said microprocessor for regulating the flow of heated air to said bed for achieving balanced temperature in said dryer during desiccant regeneration.

9. The desiccant gas dryer of claim 8 wherein the thermal sensors comprise at least first and second sensors and the bed comprising the desiccant contains a moisture gradient, said first sensor and said second sensor being positioned in areas of the bed having low and high moisture levels, respectively.

10. The desiccant gas dryer of claim 4, including means for heating the stream of air injected into the parallel purge inlet ports during desiccant regeneration. interior chamber of said vessel;
a bed comprising a regenerable desiccant agent disposed within the interior chamber of said vessel adjacent to said porous heated air distributor;
means for injecting a stream of moist gas through said moist gas inlet of said vessel for diffusion through said bed and for discharging dried gas through said dry gas outlet during a moisture sorption phase, and
means for injecting a stream of heated air into said bed through said porous heated air distributor for removing water from said bed, said desiccant gas dryer including exhaust means for discharging moisture and air during desiccant regeneration.

11. A desiccant gas dryer, which comprises
a vessel having an interior chamber defined by a vessel side wall, a first end wall having a moist gas inlet, and a second end wall having a dry gas outlet;
a porous heated air distributor disposed within the interior chamber of said vessel;
a bed comprising a regenerable desiccant agent disposed within the interior chamber of said vessel adjacent to said porous heated air distributor, said distributor having greater outlet capacity in the region of the bed where moisture stratification is more concentrated;
means for injecting a stream of moist gas through said moist gas inlet of said vessel for diffusion through said bed and for discharging dried gas through said dry gas outlet during a moisture sorption phase, and
means for injecting a stream of heated air into said bed through said porous heated air distributor for removing water from said bed.

12. The desiccant gas dryer of claim 11 which is a device for drying a gas selected from the group consisting of compressed air, natural gas and nitrogen.

13. The desiccant gas dryer of claim 12 wherein the porous heated air distributor is a tubular member running substantially the length of the bed with spaced outlets directing the flow of heated air to layers of the bed.

14. The desiccant gas dryer of claim 13 wherein the outlets of the porous heated air distributor are in the greatest number in the region of the bed in proximity to the moist gas inlet of said pressure vessel.

15. The desiccant gas dryer of claim 13 wherein the outlets of said porous heated air distributor are positioned at distances from one another sufficient to achieve substantially uniform temperature balance during desiccant regeneration.

16. A method of regenerating a desiccant gas dryer, which comprises the steps of:
providing a bed comprising a regenerable desiccant agent disposed within an interior chamber of a vessel, said bed having moisture adsorbed thereon;
(i) regenerating the desiccant by directly injecting multiple streams of heated air into the interior of said bed through multiple heated air discharge locations within said bed, said heated air discharge locations being more concentrated in those regions of the bed where moisture stratification is greater, or (ii) impinging multiple streams of heated air directly against the bed exterior wherein at least one stream directly engages the bed through a port in an exterior side wall of said vessel, and
purging moist air from said vessel.

17. The method of regenerating a desiccant gas dryer according to claim 16 wherein multiple streams of heated air from entry points from the exterior of said vessel are introduced into said bed at locations containing the highest concentration of moisture.

18. The method of regenerating a desiccant gas dryer according to claim 16 wherein multiple streams of heated air are injected into the bed spaced from one another at distances sufficient to achieve substantially uniform temperature balance during desiccant regeneration.

19. The method of regenerating a desiccant gas dryer according to claim 16 wherein said multiple streams of heated air are directly injected into said bed from parallel ports.

20. A desiccant gas dryer for drying a gas selected from the group consisting of compressed air, natural gas and nitrogen, which comprises a vessel having an interior chamber defined by a vessel side wall comprising a plurality of parallel purge inlet ports, a first end wall having a moist gas inlet, and a second end wall having a dry gas outlet;

a bed comprising a regenerable desiccant agent disposed within the interior chamber of said vessel, said parallel purge inlet ports positioned along the vessel side wall and spaced from one another at distances sufficient to achieve substantially uniform temperature balance during desiccant regeneration;

means for injecting a stream of moist gas through said moist gas inlet of said vessel for diffusion through said bed and for discharging dried gas through said dry gas outlet during a moisture sorption phase, and valve means and controls therefor for automatically regulating the injection of heated air into said bed during desiccant regeneration.

21. The desiccant air dryer of claim 1 including exhaust means for discharging moisture and air during desiccant regeneration.

* * * * *

UNITED STATES PATENT AND TRADEMARK OFFICE
CERTIFICATE OF CORRECTION

PATENT NO.    : 6,099,620
DATED         : August 8, 2000
INVENTOR(S)   : Raymond P. Arno and Daniel Blaszkowiak It is certified that error appears in the above-identified patent and that said Letters Patent is hereby corrected as shown below:

<u>Column 9,</u>
Line 44, (same as Claim 8, line 1), reads "The desiccant gas dryer of Claim 1";
should read -- The desiccant gas dryer of Claim 20 --

Signed and Sealed this

Twenty-fifth Day of September, 2001

Attest:

NICHOLAS P. GODICI
Attesting Officer    Acting Director of the United States Patent and Trademark Office